US009278812B2

(12) United States Patent
Feigner et al.

(10) Patent No.: US 9,278,812 B2
(45) Date of Patent: Mar. 8, 2016

(54) WEAR STRIP ASSEMBLY FOR RECIPROCATING CONVEYOR

(71) Applicant: Keith Manufacturing Co., Madras, OR (US)

(72) Inventors: Michael Feigner, Madras, OR (US); Troy Short, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 0 days.

(21) Appl. No.: 14/142,033

(22) Filed: Dec. 27, 2013

(65) Prior Publication Data

US 2014/0183004 A1 Jul. 3, 2014

Related U.S. Application Data

(60) Provisional application No. 61/747,978, filed on Dec. 31, 2012.

(51) Int. Cl.
*B65G 25/00* (2006.01)
*B65G 25/06* (2006.01)

(52) U.S. Cl.
CPC .................................... *B65G 25/065* (2013.01)

(58) Field of Classification Search
USPC ....................... 198/750.1, 750.2, 750.3, 750.4
See application file for complete search history.

(56) References Cited

U.S. PATENT DOCUMENTS

| 4,785,929 A | * | 11/1988 | Foster | 198/750.4 |
| 5,044,870 A | | 9/1991 | Foster | |
| 5,267,641 A | * | 12/1993 | Hallstrom, Jr. | 198/750.3 |
| 5,350,054 A | | 9/1994 | Foster | |
| 5,355,994 A | * | 10/1994 | Foster | 198/750.2 |
| 5,415,271 A | * | 5/1995 | Foster | 198/750.3 |
| 5,419,426 A | * | 5/1995 | Foster | 198/750.4 |
| RE35,022 E | | 8/1995 | Foster | |
| 5,482,155 A | * | 1/1996 | Foster | 198/750.2 |
| 5,560,472 A | * | 10/1996 | Gist | 198/750.3 |
| 6,409,009 B1 | | 6/2002 | Foster | |
| 6,782,994 B1 | * | 8/2004 | Foster | 198/750.2 |
| 7,374,034 B2 | * | 5/2008 | Foster | 198/750.3 |
| 7,510,072 B1 | * | 3/2009 | Wilkens | 198/750.3 |
| 7,556,141 B2 | * | 7/2009 | Foster et al. | 198/750.2 |
| 8,006,828 B2 | * | 8/2011 | Stout et al. | 198/750.4 |
| 8,356,982 B2 | * | 1/2013 | Petri Larrea et al. | 416/223 R |
| 8,424,674 B2 | * | 4/2013 | Drago et al. | 198/750.3 |
| 8,616,365 B2 | * | 12/2013 | Berthelsen et al. | 198/750.3 |
| 8,708,636 B2 | * | 4/2014 | Jackson | 414/509 |

* cited by examiner

*Primary Examiner* — Douglas Hess
(74) *Attorney, Agent, or Firm* — Bruce A. Kaser

(57) ABSTRACT

A wear strip assembly for a slat in a reciprocating conveyor system. The wear strip assembly includes a wear block underneath the end of the slat and wear strip member that covers the end of the slat. The slat is sandwiched between these two members, thus providing the end of the slat with protection as it reciprocates back and forth on the exit or off-load end of the conveyor system.

9 Claims, 2 Drawing Sheets

WEAR STRIP ASSEMBLY FOR RECIPROCATING CONVEYOR

TECHNICAL FIELD

The invention disclosed here generally relates to reciprocating slat conveyors. More particularly, the invention relates to a wear strip assembly that protects the ends of the slats in a reciprocating slat conveyor system.

BACKGROUND OF THE INVENTION

U.S. Pat. No. 8,006,828 (owned by Keith Manufacturing Co. of Madras, Oreg.) describes a reciprocating floor slat conveyor system that has a series of moving floor slats spaced apart by fixed slats. This is one of many configurations for conveyor systems of this type. In the '828 patent, as an example, the reciprocating slat has an inverted "V" shape with a "peak" at the top of the reciprocating slat. Some conveyor figurations have a more "flat" profile, with one slat immediately adjacent the next—which creates a more or less uniform load bearing floor. Either configuration is capable of conveying a load via reciprocating movement of the slats.

Different slat configurations are often linked to the type of load the conveyor system is designed to handle. These systems are often built into truck trailers, or the like, and used to unload bulk materials in lieu of a hydraulic lift.

A reciprocating floor conveyor built into a trailer, as an example, will "inch" the load off the trailer's back-end. This is usually done by moving all of the reciprocating floor slats outward at the same time (relative to the end of the trailer), thus moving the entire load a short distance; and then sequentially retracting a lesser number of slats that have insufficient friction with the load to pull the load back during the retraction sequence. Systems of this kind were described in the '828 patent, as well as U.S. Pat. Nos. Re35,022; 5,350,054; 6,409,009; and 5,044,870; all of which are incorporated herein by reference, as teaching examples, for the purpose of providing an underlying disclosure of the typical workings of reciprocating slat conveyor systems.

The present invention relates to what happens at the very end of the reciprocating floor slat as the load falls out of the trailer. This is a high-wear area for reasons that would be known in the art. The present invention provides improved protection for the ends of the floor slats.

SUMMARY OF THE INVENTION

The invention is a wear strip for a slat in a reciprocating conveyor system. Sometimes "slats" are referred to as "floor slats," and "reciprocating conveyors" are referred to as "reciprocating floor conveyors," or the like. This use of terminology relates to the fact that conveyor systems of this kind are often used in truck trailers, built into the floor of the trailer. However, there are other uses or potential uses for these kinds of conveying systems. Therefore, use of words like "floor" and other similar words for the purpose of routinely describing the most common application for systems the present invention relates to should not be taken in the limiting sense.

The wear strip includes a member that is shaped to cover an end portion of the slat, typically a floor slat for the reasons just mentioned. The wear strip has a frontal or forward shield portion that faces outwardly (toward the direction of slat travel) and therefore protects a leading end of the floor slat as it moves back and forth. The wear strip also has a covering shield portion that faces upward and thus protects the load carrying surface of the floor slat which is often a generally horizontal or flat load-bearing surface, although not always. Last, the wear strip has a rearward edge portion that extends down or downwardly relative to the covering shield portion.

The rearward edge portion depends downwardly such that it can be received by a transversally aligned groove carried by the floor slat. This helps retain the position of the wear strip relative to the floor slat. The groove may be cut or milled as a channel across the load carrying surface of the floor slat.

The wear strip is mounted by bolts to the floor slat, or by similar equivalent means such as, for example, attachment by welding or other kinds of fastening systems that accomplish the same function.

The wear strip may be shaped to match the shape of the floor slat. The wear strip may be part of an assembly that includes a wear block underneath the floor slat. The wear strip (on top) and wear block (underneath) sandwich the floor slat.

Other elements of the design may include a filler strip sandwiched between an underside of the wear strip and top side of the floor slat.

The features summarized above will become better understood upon review of the following more detailed description, which is to be read in conjunction with the attached drawings. Just because something is specifically summarized above, it is not intended to limit patent claim scope to just the summary or any specific wording chosen in the accompanying description. The patent claims limit the scope of the patent right.

BRIEF DESCRIPTION OF THE DRAWINGS

In the drawings, like reference numerals and letters refer to like parts throughout the various views, and wherein.

DETAILED DESCRIPTION

Figure 2:
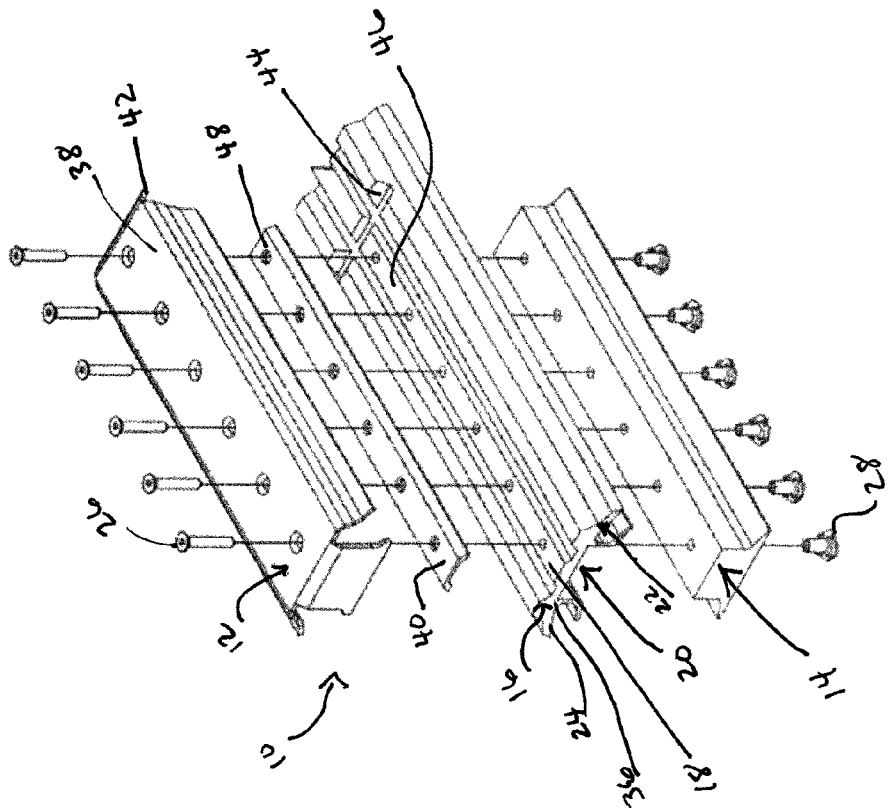
FIG. 2 is an exploded view of the wear strip assembly shown in FIG. 1.
Figure 1:
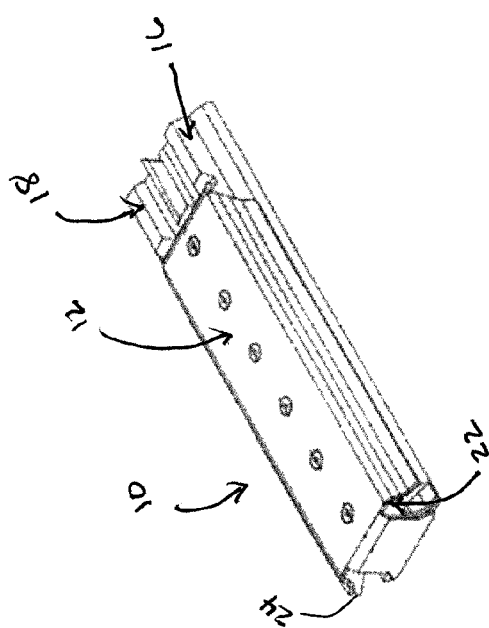
FIG. 1 is a pictorial view of a wear strip assembly constructed in accordance with an embodiment disclosed here.
Figure 3:
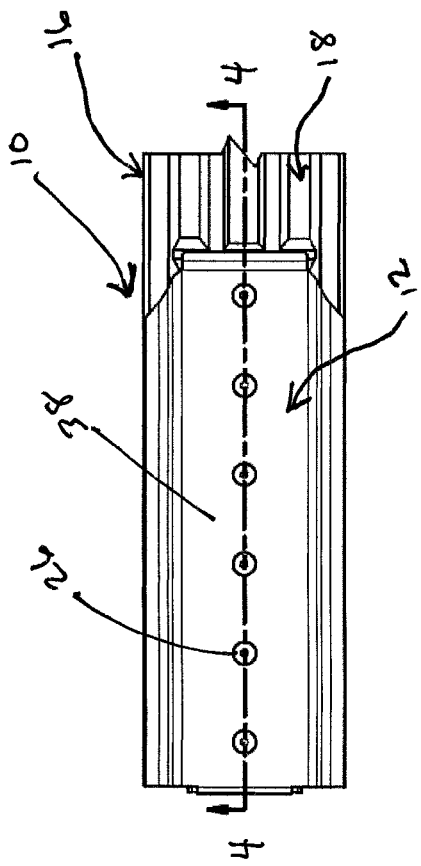
FIG. 3 is a top plan view of the assembly shown in FIGS. 1 and 2.

Referring first to FIG. 1, shown generally at 10 is a wear strip assembly constructed in accordance with the preferred embodiment of the invention, as it is presently known. The wear strip assembly includes a wear strip member 12 (see FIG. 2), and a wear block member 14 that sandwiches an end portion 16 of a floor slat (i.e., conveyor slat)—the latter being typical to a reciprocating conveyor system. The floor slat 16 is functionally similar to the design illustrated in FIG. 6 of the U.S. Pat. No. 8,006,828 (incorporated by reference), although the floor slat 16 illustrated in the Figs. here has a flattened top surface (indicated generally by arrow 18), rather than the "peaked" surface illustrated in the '828 patent.

The wear block 14 fits within a recessed region 20 on the underside of floor slat 16. Similarly, the wear strip member 12 covers the floor slat and has a shape that follows the outer shape of the load bearing surface 18 and slat side wings 22, 24 (see FIG. 1).

The wear strip member 12 is connected to the wear block 14 via a series of bolts 26. The ends of bolts 26 are connected to T-nuts 28 received in recesses 30 in the underside 32 of the wear block 14 (see FIG. 4). The T-nuts 28 are pressed in place, typically.

Figure 4:
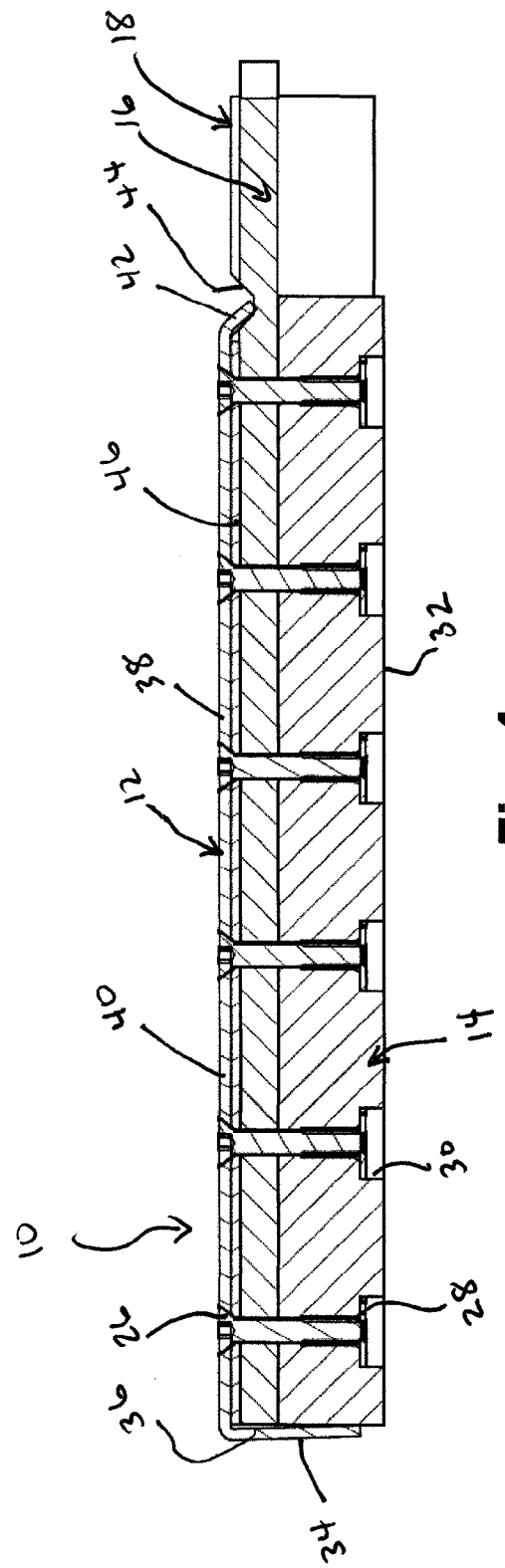
FIG. 4 is a cross-sectional view of the assembly, taken along line 4-4 in FIG. 3.

Referring to the cross-sectional view shown in FIG. 4, and as mentioned above, the wear strip member 12 is shaped to cover an end portion of the floor slat 16. It includes a frontal shield portion 34 that faces forward (relative to the direction of reciprocating floor slat travel) and protects a leading end 36 of the floor slat. A covering shield portion 38 of the wear strip member 12 faces upward and protects the load carrying surface 40 of the floor slat's end portion. Finally, a rearward edge portion 42 of the wear strip member 12 depends downwardly relative to the covering shield portion 38.

The rearward edge portion 42 is received within a transversely aligned groove 44 that is carried by the floor slat 16. In the embodiment described here, the groove 44 is milled or channeled directly in the load bearing surface 18 of the floor slat 16. However, there may be alternatives that accomplish the same function without directly milling out material from the floor slat 16. The same function might be accomplished via an add-on accessory.

The wear strip assembly 10 also includes a filler strip 46 between the wear strip member 12 and floor slat 16. Both the filler strip 46 and the floor slat 16 have a series of bores 48 (see FIG. 2) for passage of bolts 26 through the wear block assembly 10, to the T-nuts 28. The filler strip 46 may be used as an adaptor for mating the wear strip member 12 to other shapes of underlying floor slat 16 structure (not shown).

There are reasonable design changes that could be made to the foregoing without departing from what is considered to be the invention. The drawings show an end portion of the floor slat 16 that is protected by wear strip assembly 10. The frontal or forward shield portion 34 covers both the floor slat 16 and most of the wear block 14, as illustrated in FIG. 4. However, these dimensions can change relative to each other within the framework of the idea of providing floor slat wear protection. Similarly, the downwardly depending rearward edge portion 42 is shown "angled" into a V-shaped groove 44. It is reasonable to presume that the V-shape could be changed to something like a rectangular channel, or another functional equivalent, with edge 42 then having a more vertical alignment.

The scope of patent protection is not limited to the foregoing description. Instead, patent protection is limited to the patent claim or claims that follow, the interpretation of which is to be made in accordance with standard doctrines of patent claim interpretation.

What is claimed is:

1. A wear strip for a slat on a reciprocating conveyor, comprising:
   a wear strip member shaped to cover an end portion of said slat, said wear strip member having a frontal shield portion that faces outward and protects a leading end of said slat end portion, a covering shield portion that faces upward and protects a load carrying surface of said slat end portion, and a rearward edge portion that extends downwardly relative to said covering shield portion,
   means for mounting said wear strip member to said slat; and wherein
   said rearward edge portion is received by a transversely aligned groove carried by said slat.

2. The wear strip of claim 1, wherein said transversely aligned groove is a groove in the load carrying surface of said slat end portion.

3. The wear strip of claim 1, including a filler strip sandwiched between an underside of said covering shield portion and a topside of said load carrying surface of said slat end portion.

4. The wear strip of claim 1, wherein said covering shield portion is shaped to match the shape of said slat end portion.

5. A wear strip assembly for the end of a slat in a reciprocating conveyor apparatus, comprising:
   a wear block member for protecting an underside of an end portion of a slat, said slat end portion covering an upper region of said wear block member;
   a wear strip member covering at least an endmost region of said end portion of said slat, said wear strip member having a frontal shield portion that faces outward and protects a leading end of said slat end portion, said wear strip member further having a covering shield portion that faces upward and protects at least a load carrying surface of said endmost region of said slat end portion, and said wear strip member further having a rearward edge portion that extends downwardly relative to said covering shield portion, and further, said rearward edge portion is received by a transversely aligned groove carried by said slat; and
   means for sandwiching said slat end portion between said wear strip member and said wear block member.

6. The wear strip of claim 5, wherein said transversely aligned groove is a groove in said load carrying surface of said slat end portion.

7. The wear strip of claim 5, including a filler strip sandwiched between an underside of said wear strip member and a topside of said load carrying surface of said slat end portion.

8. The wear strip of claim 5, wherein said wear strip member is shaped to match the shape of said slat end portion.

9. A wear strip for a slat on a reciprocating conveyor, comprising:
   a wear strip member shaped to cover an outer end portion of said slat, said wear strip member having a frontal shield portion that faces outward and protects a leading outer end of said slat end portion, and a covering shield portion that faces upward and protects a load carrying surface of said slat end portion.

* * * * *